United States Patent [19]

DeLuca

[11] Patent Number: 4,967,480
[45] Date of Patent: Nov. 6, 1990

[54] FOUR-WHEEL ALIGNMENT AND MEASURING TOOL

[76] Inventor: George M. DeLuca, 7424 W. 100th St., Bloomington, Minn. 55438

[21] Appl. No.: 349,982

[22] Filed: May 8, 1989

Related U.S. Application Data

[63] Continuation of Ser. No. 70,772, Jul. 7, 1987, abandoned.

[51] Int. Cl.$^5$ .............................................. G01B 5/255
[52] U.S. Cl. ..................................... 33/288; 33/203.18
[58] Field of Search ................ 33/288, 203.15, 203.16, 33/203.17, 203.18, 203.19, 203.20, 203.21, 600, 608

[56] References Cited

U.S. PATENT DOCUMENTS

| | | | |
|---|---|---|---|
| 3,164,910 | 1/1965 | Manlove | 33/203.18 |
| 3,181,248 | 5/1965 | Manlove | 33/203.18 |
| 3,805,399 | 4/1974 | Price | 33/336 |
| 3,892,042 | 7/1975 | Senften | 33/288 |
| 4,180,915 | 1/1980 | Lill et al. | 33/203.19 |
| 4,236,315 | 12/1980 | Curchod et al. | 33/203.18 |
| 4,337,581 | 7/1982 | Eck | 33/203.18 |
| 4,341,021 | 7/1982 | Beissbarth | 33/203.18 |
| 4,408,399 | 10/1983 | Darwood et al. | 33/203.18 |
| 4,510,694 | 4/1985 | Boyce | 33/203.18 |
| 4,523,844 | 6/1985 | Titsworth et al. | 33/288 |
| 4,569,140 | 2/1986 | Hobson | 33/203.18 |
| 4,594,789 | 6/1986 | Marino et al. | 33/203.18 |
| 4,615,618 | 10/1986 | Bailey et al. | 33/203.18 |

Primary Examiner—William A. Cuchlinski, Jr.
Assistant Examiner—Patrick R. Scanlon
Attorney, Agent, or Firm—Kinney & Lange

[57] ABSTRACT

A device for measuring and determining the condition of wheel position and alignment in a unibody automobile, include wheel setback, toe-in, toe-out, front end squareness, camber, caster, wheel base, tram, and tracking in a simple single configuration tool. The basic instrument is a fixture that installs on each wheel within the perimeter of the wheel, and includes angle measuring and distance measuring arms that interplay geometrically to diagnose each required wheel/body condition. Simple mechanical rulers and levers are all that is necessary for use.

8 Claims, 7 Drawing Sheets

FOUR-WHEEL ALIGNMENT AND MEASURING TOOL

This is a Continuation of application Ser. No. 07/070,772, filed July 7, 1987 (now abandoned).

BACKGROUND OF THE INVENTION

1. Field of the Invention.

The present invention relates to an apparatus and method for aligning wheels of an automobile, truck or the like using a simple wheel attachment device and standard measuring tools.

2. Description of the Prior Art.

Thrust line wheel alignment using devices that clamp onto the wheel, but which require a "halo" that surrounds the vehicle for use is shown in Hobson U.S. Pat. No. 4,569,140. This patent has scaler members that extend forwardly and rearwardly of each wheel. Additionally, the procedure for using the devices is made unnecessarily complicated, and involves hardware that is not needed with the present concept.

U.S. Pat. No. 3,164,910 shows uses of cables or tapes along the sides of a vehicle's wheels, with a junction member in the front, and with the holding devices fastened to the wheel rim.

U.S. Patent No. 4,510,694 also shows a wheel alignment apparatus and method with clamping frames that fit over the tires, so that they move with the wheels. Additional United States patents which illustrate the general state of the art include the following:

U.S. Pat. No. 3,181,248—Manlov
U.S. Pat. No. 3,805,399—Price
U.S. Pat. No. 4,236,315—Curchod
U.S. Pat. No. 4,341,021—Beissbarth
U.S. Pat. No. 4,408,399—Darwood et al.

The patents cited in the Hobson U.S. Pat. No. 4,569,140 also are of general interest and illustrate the state of the art.

SUMMARY OF THE INVENTION

The present invention relates to a device for measuring wheel alignment on all four wheels of a vehicle using simple to apply fixtures and simple to use measuring devices to diagnose each required wheel and body condition. Mechanical rulers, and existing angle indicators are used. The fixtures comprise clamps that are positioned on the interior surface of the outer edge portion of a wheel rim so that each unit can be precisely positioned relative to a plane perpendicular to the rolling axis of the wheel, and holds scaler bars or arms extending perpendicularly from the plane of the rim or wheel itself. The measurements of angles and the like are taken within the periphery of the rim. A center support is used with an angle measuring unit for measuring camber of a wheel. The preferred unit is a commercially available level sensor controlled by an electronic circuit to automatically zero the sensor and provide a digital angle indication.

The scaler bars on each of the fixtures are spaced apart in fore and aft direction, and reference indicator marks are provided on the "outer" bars, that is, on the front scaler bar on the front wheels and the rear scaler bar on the rear wheels, on each side of the vehicle. Flexible indicator lines are fixed to the outer scaler bars at the reference marks. The indicator lines pass over scales on the inner scaler bars. The scales extend perpendicularly to the plane of the wheel, and the lines are at a set reference distance outwardly when the wheels are in alignment from this plane. By taking measurements at different wheel positions, toe-in of both front and rear wheels can be determined, and by having specifically located and oriented protractors giving angular measurement on the inner scaler bars of each of the fixtures, that is, on the rear bars on the front wheels and the front bars on the rear wheels, conditions during turns can be determined and adjusted.

The wheel setback or squareness can be determined by measuring distance between the scaler bars on each side of the vehicle, and cast can be determined, as well as steering angle indicator for four-wheel steer vehicles using protractor marks.

The fixtures include a support for mounting the angle measuring device that is used for determining the camber, as well as kingpin inclination.

DETAILED DESCRIPTION OF THE PREFERRED EMBODIMENTS

First referring to FIGS. 1 through 4, the details of the individual wheel fixtures are shown. Four fixtures are used one for each wheel. A fixture 10 mounts scaler bars within the wheel perimeter, and the scaler bars are perpendicular to the plane of the outer edge of the rim, and thus perpendicular to the rolling plane of the tire and in a position so that necessary measurements can be made accurately. The fixture 10 includes a pair of scaler bar assemblies comprising an outer scaler bar assembly 12, which is the one toward the exterior of the vehicle, that is, the front scaler bar on a front wheel and a rear scaler bar on a rear wheel. An inner scaler bar assembly 14 is positioned on the side of the wheel toward the center of the vehicle. The scaler bar assembly 12 includes a wheel engaging and positioning head flange 15 that forms a T with an outer scaler bar 16 forming part of the scaler bar assembly 12. The scaler bar 16 is perpendicular to the inner surface of the head member 15. The head member 15 is of size so that its inner surface will rest against a shoulder surface 17 formed by an offset inner surface 18 of a vehicle wheel 19, when properly positioned by adjustable set screws 22 engaging the surface 18. The wheel has an outer edge flange to the exterior of the shoulder surface 17 which also can be used for mounting the fixtures. The set screws 22 protrude through the head 15, and the set screws on each head are spaced apart so that they engage the surface 18 at two spaced points a sufficient distance apart so that the set screws 22 will tend to center the scaler bar 16 with the axis of rotation of the wheel. The set screws can be positioned on the interior of the outermost flange of the wheel, and also may be on the outside surface of the wheel and clamped by inward force, if desired.

The inner scaler bar assembly 14 has a head member 25 that is joined to an inner scaler bar 26, to form a T arrangement, so that the inner scaler bar 26 is perpendicular to the inner surface of the head member 25. As shown, the head member 25 is made so that portions of its inner surface will rest against the surface 17 of wheel 19. The head is positioned with a pair of spaced apart set screws 27 which engage the surface 18. The set screws 27 correspond to the set screws 22, and are spaced apart so that the chordal line between the axes of the set screws 27 is sufficiently long so they will tend to center on the arc of the surface 18 with respect to the axis of rotation.

The scaler bar assemblies 12 and 14 of each fixture 10 are joined together by a cylindrical guide rail 30, which is fixed to the scaler bar 26 of the inner scaler bar assembly 14, and is slidably mounted through a provided opening in the scaler bar 16 of the outer scaler bar assembly 12. A reaction lug 32 is mounted to the outer end of the rail 30, to the outside of the scaler bar 16, and a screw 33 is rotatably passed through an opening in the lug 32, and is threadably mounted in an opening in the outer scaler bar 16, so that when the fixture is to be installed on a wheel, the screw 33 is turned to move the set screws 22 and set screws 27 apart so they engage the surface 18 under a separating force, and by adjusting and manipulating the head members 15 and 25 slightly, the set screws 22 and 27 will be properly seated so that the scaler bars 16 and 26 of each fixture are centered on and parallel to the axis of the wheel. A hand wheel or head 34 is fixed to screw 33 and has a surface which bears against block 32 to provide reaction force for separation of the head members 15 and 25. The rail 30 has an arm 35 mounted thereon which extends uprightly and is positioned so the axis of the wheel passes through the central axis of the arm 35. The arm 35 has a surface 35A used for a reference surface from which camber angle readings can be taken. The arm 35 is positioned above the plane of the upper surfaces of the scaler bars 16 and 26 and the surface 35A is parallel to the inner surfaces of the head members 15 and 25.

The inner surfaces of the head members 15 and 25 are resting against the shoulder surface 17, which defines a plane of wheel rotation. The surface 35A is parallel to the plane of wheel rotation. The axes of the outer scaler bar 16 and the inner scaler bar 26 are perpendicular to the inner surfaces of the head members 15 and 25 and thus perpendicular to the plane of the wheel. The scaler bars 16 and 26 are thus held in a desired position for determining measurements that are necessary for insuring that the wheels are properly aligned. Also, the axes and respective surfaces of the scaler bars 16 and 26 are spaced at equal distances from the axis of rotation of the wheel because the positioning of the set screws 22 and 27 is the same on both head members 15 and 25 (the head members are identical). When the set screws are engaging the interior arc of the annular surface 18 at distinct points, the cordal line defined by the axes of the set screws 22 on head member 15 and set screws 27 on head member 25 will be the same radial distance from the axis of the wheel 19.

In placing the fixture 10 onto an individual wheel, as stated, the set screws 22 and 27 are adjusted so that the ends protrude beyond the surface of the head members 15 and 25, and the head member 25 is placed so that the set screws 27 are engaging the annular offset surface 18, and then the screw 33 is adjusted to move the head member 15 to the proper location so that the set screws 22 are in engagement of the annular surface 18 and both of the set screws on each head are properly seated. The screw 33 is tightened as desired to hold the fixture 10 in place. The head members are positioned properly by the annular surface 18 as well as the shoulder surface 17.

Figure 1:
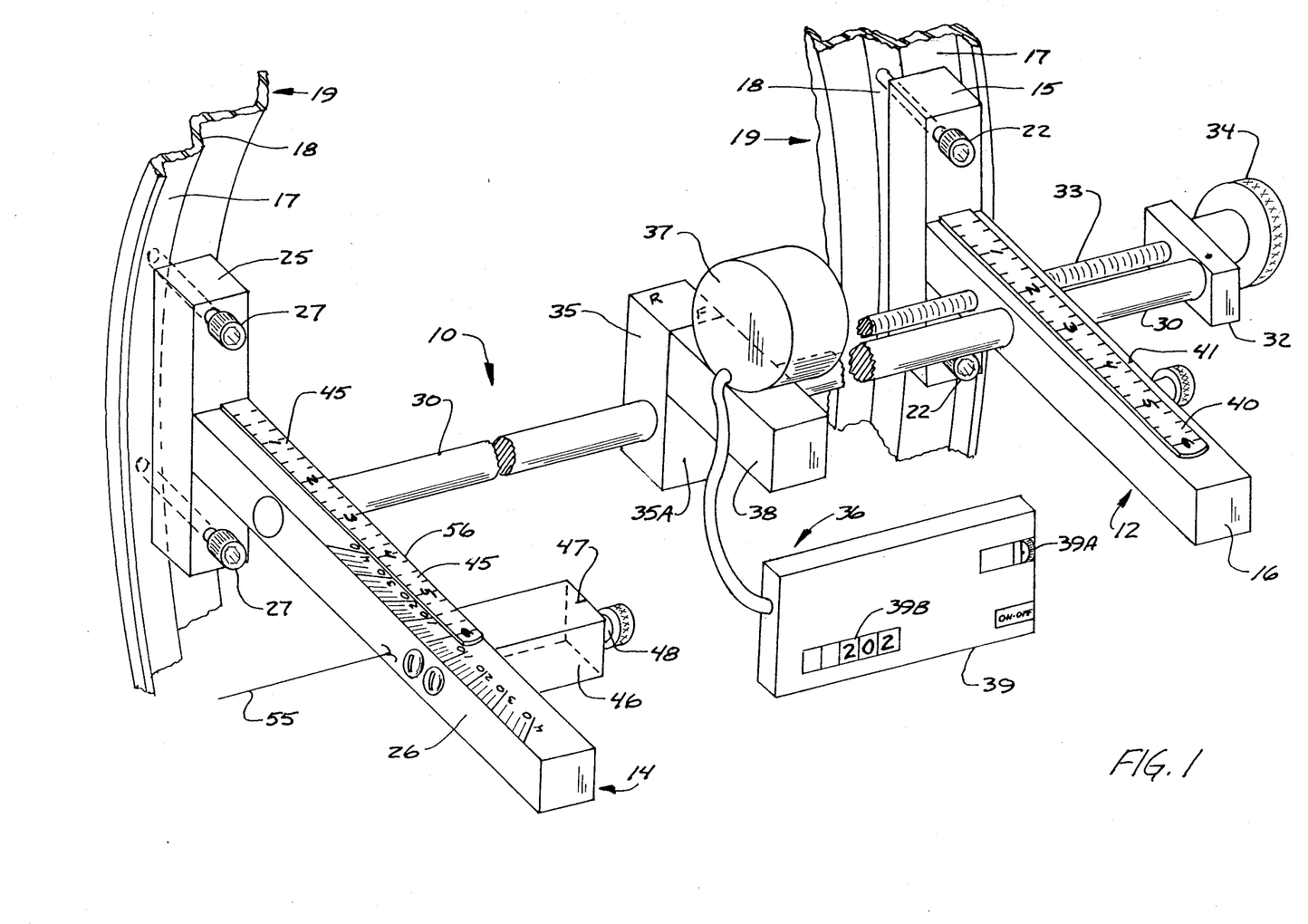
FIG. 1 is a perspective view of a vehicle wheel having a fixture made according to the present invention and installed thereon.

The fixtures of the present invention are enhanced in usage for determining various camber angles and the like through the use of a unique, commercially available battery powered angle computer. This is illustrated generally at 36, and it is a commercially available unit, which has an angle indicating head 37 that is mounted onto a mounting block 38 useful with the present fixture, and which is made to have all of its outer surfaces machined so that the side surfaces are parallel, the bottom surface is exactly perpendicular to the side surfaces, and the end surfaces are perpendicular to both the bottom and side surfaces. A computing unit 38 is, as stated, battery powered and used for sensing the position of the sensor unit 37 and the mounting block 38 (the unit has to be 39) and includes a zeroing wheel 39A which can be used for immediately setting the reference to zero when the mounting block 38 is in a desired location. Additionally, there is an indicator 39B that provides a digital reading of the angle of inclination of the unit 37, generally in relation to the bottom and end surfaces thereof. For horizontal orientation, as shown in FIG. 1, an end surface of the mounting block 38 is mounted against the surface 35A, and thus the central axis of the mounting block is perpendicular to the plane of the wheel.

The block 38 can be set onto the floor on which the wheel 19 is mounted, and zeroed, which provides for a reference immediately at the wheel for determining the angle of camber, for example, once the fixture 10 is in place at a particular wheel. All that has to be done is place the mounting block onto the arm 35, using suitable dowels or other mounting devices so that the end surface that is shown against the surface 35A is tightly against this surface and is truly mated. Of course, the surfaces have to be clean, but once they are mated, then a reading can be taken directly from the indicator 39B as to the angle of camber.

As will be explained, this mounting block 38 with its angle sensing unit 37 can also be used for determining steering axis inclination, direct reading of the positioning or angles of McPhearson struts and where there is no strut suspension can be used for determining the steering axis inclination by taking measurements when the front wheels, or other wheels which steer, are turned through a known arc on either side of a reference straight-ahead position.

The fixture arm 35 simplifies the making of these measurements, but the angle computer also can be used for things such as determining whether or not a wheel is bent merely by placing the bottom surface of the block 38 (after zeroing on the floor adjacent to the wheel 19 that is being checked) on the top of the scaler bars 16 and 26, respectively, and determining the angle difference between the two. If there is a difference, then the wheel is bent. The fixture 10 can be placed at two positions annularly around the wheel to determine the degree of problems of a bent wheel in other locations. This always assumes that the fixture is properly seated with the inner surfaces of the head members solidly engaging the shoulder surface 17 and properly positioned with respect to the wheel axis.

Figure 2:
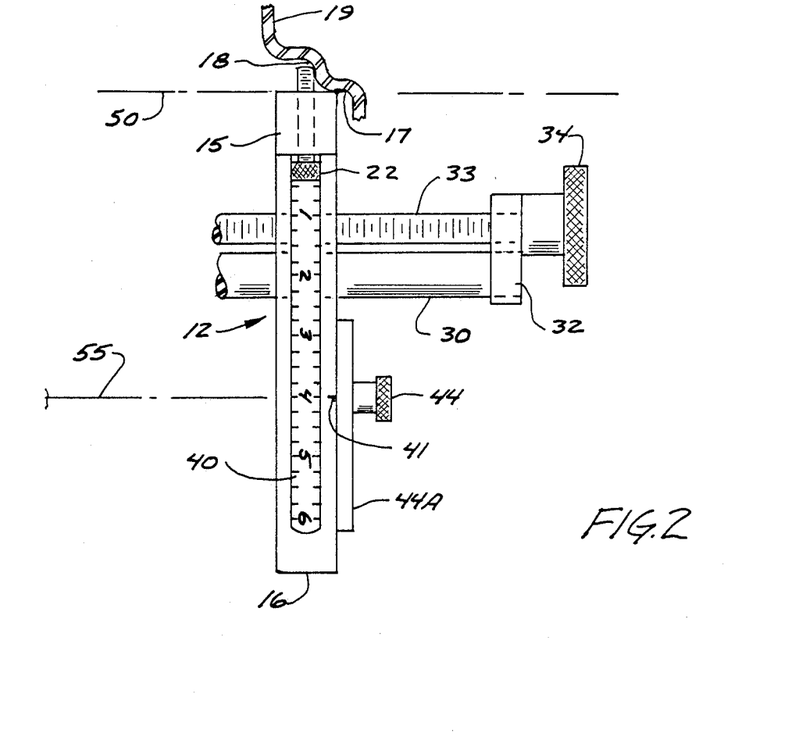
FIG. 2 is a fragmentary top plan view of a portion of the fixture shown in FIG. 1.
Figure 3:
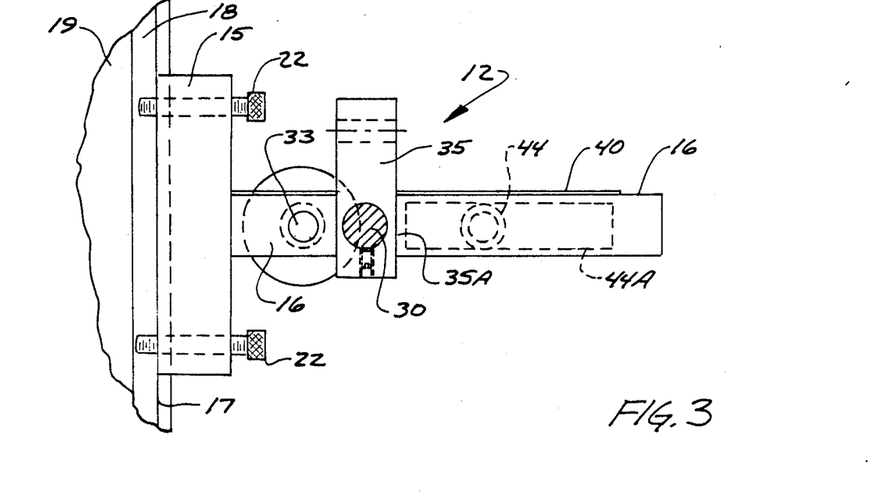
FIG. 3 is a sectional view taken as on line 3—3 in FIG. 2.

Reference is made specifically to FIG. 2, in which the outer scaler bar assembly 12 is used for establishing and holding scaler bars on each side of the vehicle at a reference position that is, as shown, four inches out from the plane of the shoulder surface 17, and thus four inches out from the plane of the inner surfaces of the head members 15 and 25. Fastening of the aligning lines is done with a clamp plate 43 and a screw 44 that is threadably mounted into each of the outer scaler bars 16, and on the outer surface, that is, the surface toward the outside of the wheel on which it is mounted. The screw tightens plate 43 against the surface of scaler bar 16 to clamp a line in place. A scale or ruler 40 is fixed to the upper surfaces of scaler bars 16. A notch or mark 41 is provided at the four-inch mark as measured from the surface of head member 15 opposite from the surface engaging edge 17.

The scaler bars 26 of the scaler bar assembly 14 have linear scale members, that is, ruler members 45 mounted on the upper surface thereof. The scales or rulers 45 are graduated in sixteenths of an inch or other suitable length indications, and fixed in place to provide readings indicating alignment and misalignment.

A reference block 46 (FIG. 1) is fixed to the inner surface of the respective scaler bars 26. The block 46 extends toward the scaler bar 16 on the same wheel. This reference block 46 has a reference mark 47 at an inner end thereof, (toward the wheel axis), adjacent to a screw or clamp 48 that is threaded into the end of the reference block 46. Line or reference mark 47 aligns with the six-inch mark on the scale 45, so that it is six inches out from the plane indicated at 50 of the surface 17 of the rim. The axis of steer of the wheels, which is generally centered on the tire patch, is essentially midway between the scaler bars 16 and 26. The block 46 is used for determining angles and as will be explained, because the steer axis of the wheels is offset from the block 46, the angle indicator lines shown generally at 49 are not evenly spaced about the point where a line is clamped in place at the end of the mark 47.

When a line 55 is clamped with the plate 43 and screw 44 and centered directly over the four-inch mark 41 on scaler bar 16 and with the wheel track width the same on the front and rear of a vehicle, the line also is centered directly over the four-inch mark 56 on scale 52 of the scaler bar 16, and all is square and aligned.

Figure 4:
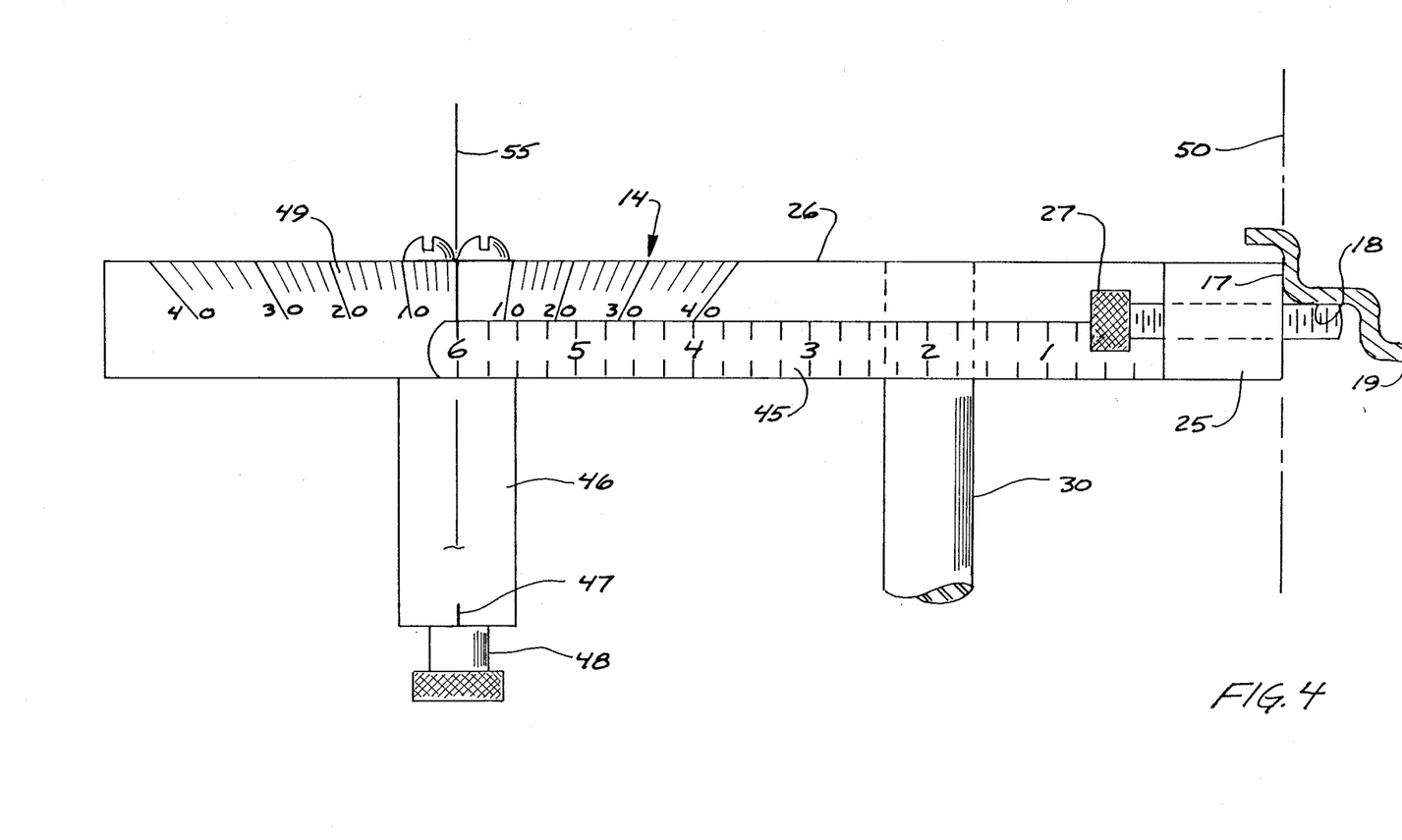
FIG. 4 is an enlarged top plan view of a typical scaler bar having a protractor for indicating steer angle of the associated wheel.
Figure 5:
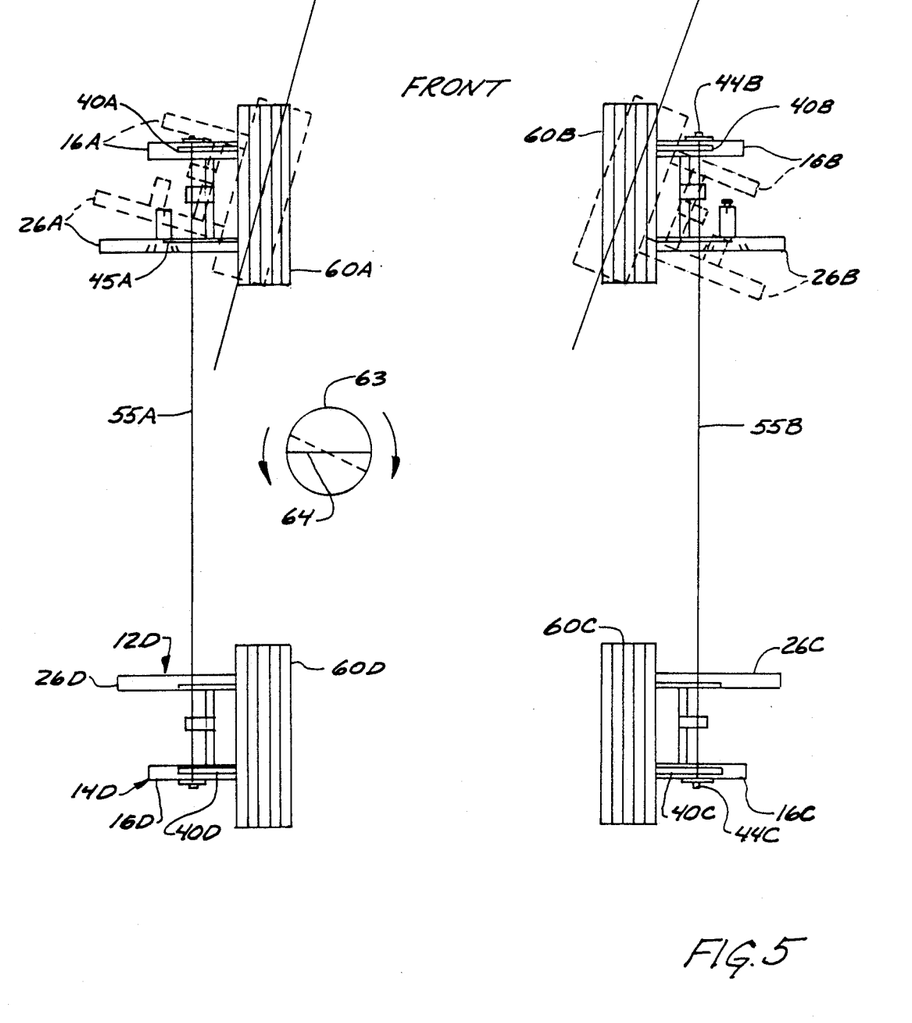
FIG. 5 is a top view of a typical four-wheel drive layout showing a basic orientation, and in dotted lines a way of centering the steering wheel.

From the general showing of FIGS. 1–4, reference is now made to FIG. 5, where schematic representation of the fixtures 10 at each wheel are illustrated.

In FIG. 5, the schematic representation is with the front of a vehicle labeled as shown, and in this configuration it is assumed that the vehicle steer is front-wheel steer only, although four-wheel steer also can be accommodated as will be explained.

There are instances where a steering wheel spoke is not parallel to the horizontal when the vehicle is being driven straight, and the present device will permit keeping the vehicle wheels in the proper orientation for correcting steering wheel portions. FIG. 5 also illustrates the measurement of toe-in and toe-out on turns, to see if adjustments are necessary.

Four scaler bar assemblies 10 are shown schematically with individual wheels indicated at 60A, 60B, 60C and 60D, numbered clockwise from the front left wheel, and thus the individual alignment bars will also use the same letter designation. For example, the front left wheel 60A has an outer scaler bar 16A, that forms part of a fixture 10, and an inner scaler bar 26A, generally as shown in FIGS. 1–4. The scaler bar 16A has a line 55A clamped with a clamp screw 44A, and the line 55A passes over the scaler bar 26A and overlies a scale 45A on that scaler bar 26A. Angle indications 49A also are shown on the inner edge of the scaler bar 26A.

The wheel 60B has scaler bar 16B, which is the outer scaler bar, an inner scaler bar 26B, and the arrangement using a clamp screw 44B for holding a line 55B along the opposite side of a vehicle from line 55A. The lines 55A and 55B are positioned to the outside of the vehicle by spacing the lines outwardly from the wheels. Thus, the lines 55A and 55B are clear of fenders and other sheet metal.

The right rear wheel 60C has an outer scaler bar 16C which as can be seen is to the rear of the vehicle, and an inner scaler bar 26C that may have the same scale as previously explained. The block 47 can be left off the fixtures used for non-steering vehicle wheels. A clamp screw 44C clamps the opposite end of the line 55B, so that the line 55B overlies the scaler bars 26C and 16C, and is positioned four inches out from the outer edge plane of the wheel rim.

The left rear wheel 60D has an inner scaler bar 26D, that has the scale 45D, and an outer scaler bar 16D that has the clamp screw 44D to hold the opposite end of line 55A in position.

A steering wheel indicated generally at 63 has the cross bar 64 that is to be adjusted, and as shown, if the steering wheel horizontal bar 64 is offset counterclockwise with the front wheels straight ahead, when the steering wheel is moved clockwise so that the horizontal bar is in its dotted line position, the front wheels will also be in their dotted position shown in FIG. 5, and the distance indicator on the scale 45B will be more than the four-inch reference measurement from the plane 50B of the wheel, and the distance indicated on the scale 45A with the wheel in its dotted line position will be less than four inches. This will be proportional to the amount of the steering wheel cross bar 64 angular offset from the horizontal position.

The front wheel toe-in when turning is also checked in the same manner. Assuming that the steering wheel is correct, in a right turn so that the steering wheel 63 is turned counterclockwise to a reference steer position, if the line 55A is over the two-inch mark on the scale 45A, with the wheel 60A in its dotted line position in FIG. 5, and the line 55B is over the six-inch mark on the scale 45B, it is known that the toe-in (or toe-out) is equal for the two wheels which steer, but if the distances are unequal, this is an indication that an undesirable toe-in or toe-out condition exists and adjustments can be made. The readings on the scales on scaler bars 26C and 26D are ignored after the turn is made. However, the toe-in and toe-out of rear wheels 60C and 60D can be determined by comparing the measurements between the scales 45C and 45D when the front wheels are centered and the lines 55A and 55B are both indicated as being four inches out from the planes of the wheels on the scaler bars 26A and 26B.

Adjustments can be made in opposite direction, that is, left-hand steer, as well.

Figure 6:
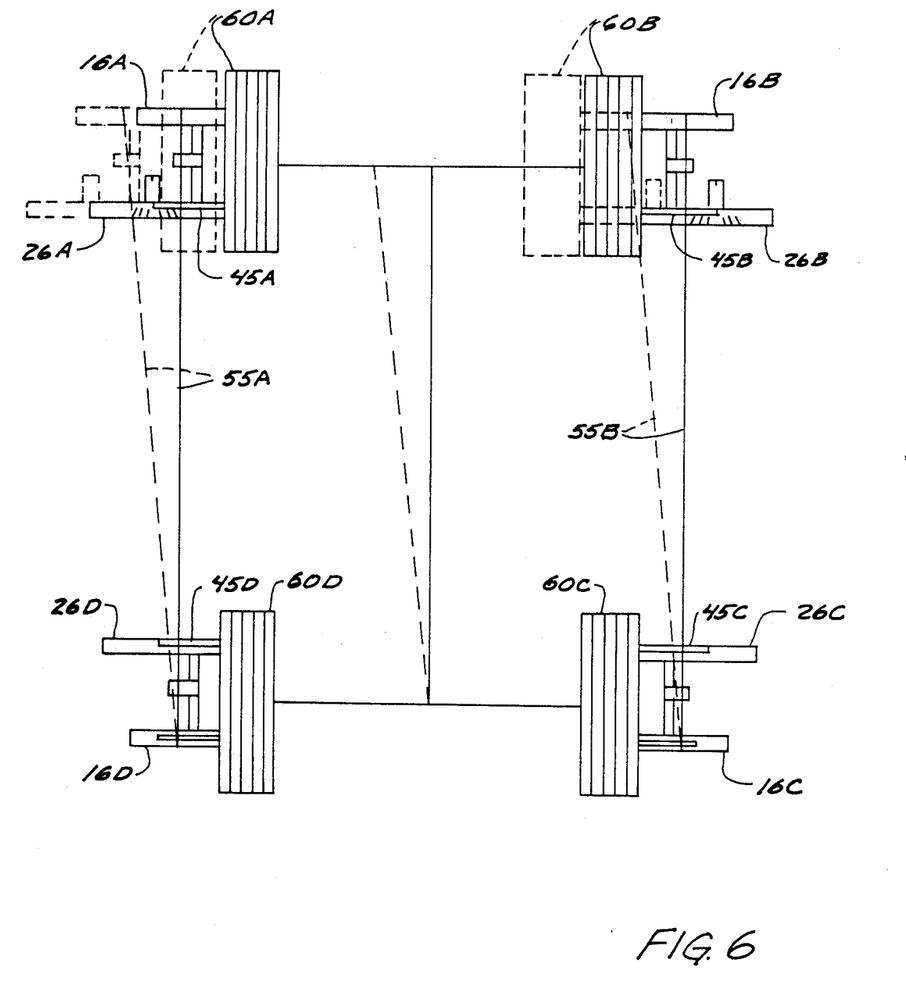
FIG. 6 is a schematic top plan view of a typical wheel arrangement illustrating the center line and thrust line errors which can be detected with the present invention.

In FIG. 6, the determination of proper tracking of the front and rear wheels on the opposite sides of the vehicle can be made as shown. If the front wheels are not directly ahead of the rear wheels as shown in FIG. 6 in dotted lines for the wheels 60A and 60B, the measurements in the dotted line position of the scales 45A and 45B will be different. The measurement on scale 45A in the dotted line wheel position will be less than four inches, and the measurement on the scale 45B will be greater than four inches, depending on the amount of offset. The axles can be shifted laterally in order to bring the front or rear wheels over so that wheels track. This alignment of the track of the wheels should be done before the toe-in and toe-out measurements shown in FIG. 5 are made, and then after that the toe-in and toe-out measurements on the scaler bars is carried out.

Figure 7:
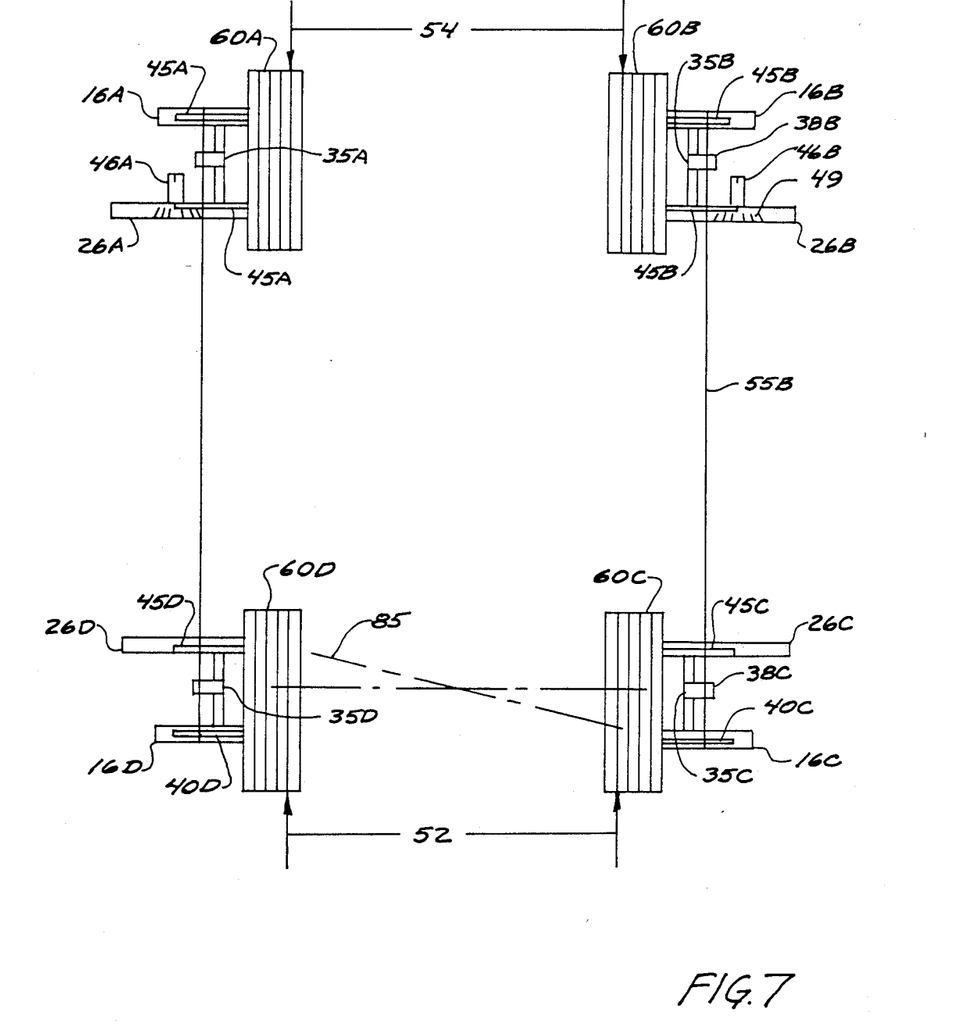
FIG. 7 is a plan view of a typical vehicle illustrating compensation for differences in wheel base width between the front and rear wheels.

FIG. 7 shows two features. The first is the ability to accommodate different track widths. If the front wheels have a track of 54 inches and the rear wheels have a track of 52 inches, respectively, the lines 55A and 55B are set one inch further out of scaler bars 16C and 16B. For example, with the reference setting at four inches for the front wheels, the reference will be five inches out on scaler bars 16C and 16D for the rear wheels. Also, the toe-in and toe-out for both the front and rear wheels with the front wheels straight ahead is determined merely by comparing the scale readings on the scales 45A and 45B on the scaler bars 26A and 26B, for the front wheels, and by comparing the reading on the scales 45C and 45D. On scaler bars 26C and 26D for the rear wheels, the amount of toe-in and toe-out is directly indicated. The directly indicated measurements are proportional to the actual toe-in measurement. For example, a 1/32" difference in the readings of where lines 55A and 55B cross the respective scales 45C and 45D from the standard, reference scale position, as shown the five-inch mark, would show a toe-in of approximately one-sixteenth inch for the rear wheels. This would be if the measurements on the scales 45C and 45D are greater than the five inches.

Figure 8:
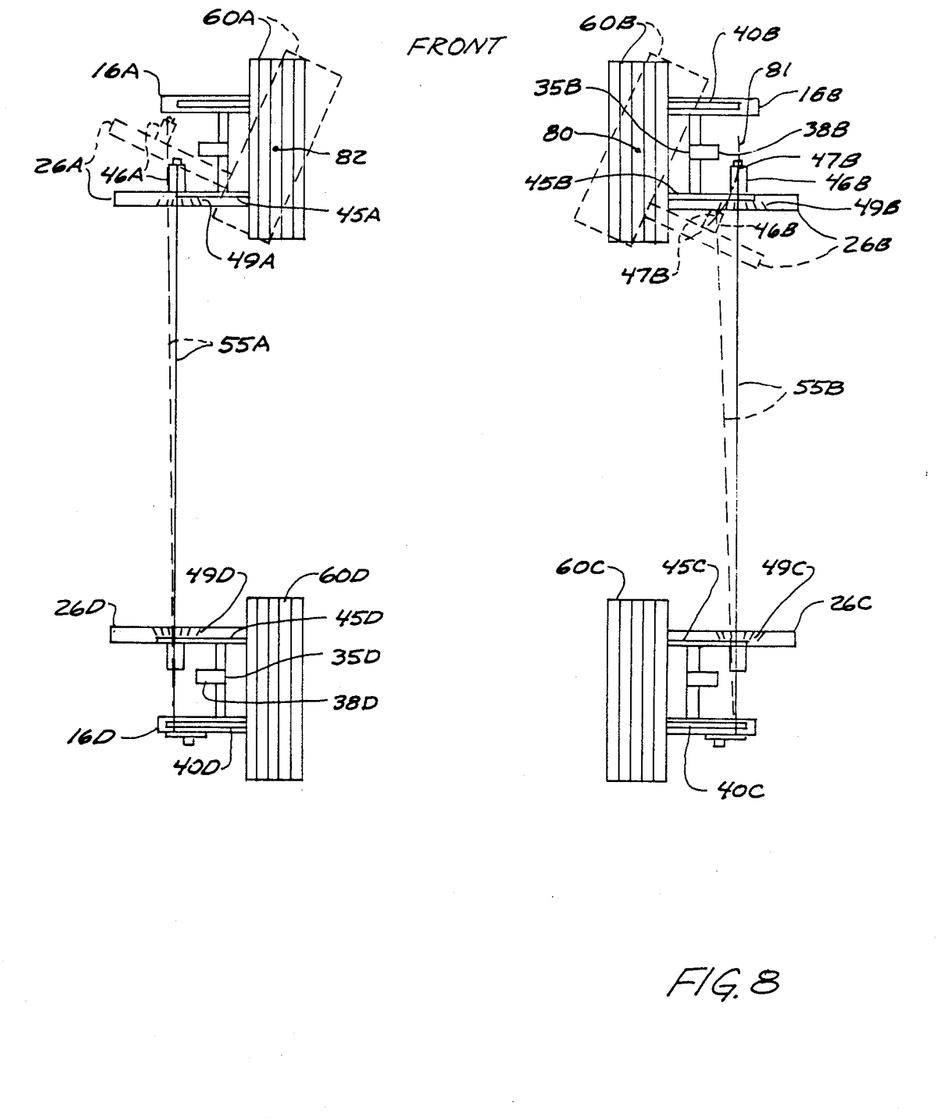
FIG. 8 is a schematic representation of the four wheels of a vehicle showing how toe in and toe out on turns is checked.

In FIG. 8, a schematic representation of measurement of the toe-out on turns, and also a way of determining a relative caster is illustrated schematically.

The lines 55A and 55B are placed onto the block 46 and clamped in place with the screw 48 with the line over the reference mark 47 for each of the front wheels. These then are adjacent to the angle indicating indicia 49. With the wheels straight ahead, the lines 55A and 55B should be positioned over the zero mark.

Also shown on the right-hand front wheel 60B of FIG. 8 is an illustration that shows the reason for the irregular angle indications as illustrated in FIG. 4. Because the point 47 is not on the center point of steer, which is schematically illustrated at 80, in FIG. 8 and because it will move in an arc as indicated by 81, it can be seen that as the steer movement is made, as shown to the right, the point 47 will move to the rear and inwardly along the arc path 81. Point 47 will then move to a position substantially as shown at 47B and the line 55B will lie over a particular angle indicator that will, when properly compensated as shown in FIG. 4, provide the correct angle indication for the amount of steer about the steer axis 80. As can be seen for a right turn in relation to wheel 60A, which is the left front wheel, the point 47 will move on an arc 83 about a steer axis 82 of the left front wheel. This will move the point 47 for attachment of the line 55A to position shown at 47A, which is forwardly and slightly inwardly as well. The angle indicia on the scaler bar 26A will be compensated to provide a correct angle indicating the true angle of steer about the axis 82.

To determine the toe-in during steering, the wheels can be turned to the right as shown in FIG. 8, and the steer angle readings taken from the angle indicia 49 on each of the scaler bars 46A and 46B, and can then be compared to see what the toe-in is. For example, in a right turn the turn to the right might be so that the left front wheel 60A indicates a steer of 38°, while the angle indicia or indicators 49 on the scale bar 26B would indicate 40° so that there would be a specified amount of toe-in during a standard reference turn. This can be adjusted of course in a normal manner, and turns to the left can also be checked for the toe-in during steer.

If the unit is a four-wheel steer, the same procedure can be used for the rear wheels.

The checking of caster without strut suspension can be done using the angle indicators, and the set-up shown in FIG. 8 as well. For example, when there is caster, and no strut mounting, the surface 35A of the arm 35 will change in its position relative to a horizontal reference as the wheels are steered. Utilizing the angle indicator block 38, and the sensor 37, mounted as shown in FIG. 8 schematically, wherein the block 38 is illustrated, if the caster of the left front wheel is to be checked, that is, wheel 68, the left front wheels can be turned 20° to the right as indicated by the angle indicia 49 on the scaler bar 26A, and then with the block 38 mounted as shown in FIG. 1, the angle indicator is zeroed. This can be done, even though the plane of the bottom of the block 38 is not exactly horizontal. After zeroing with the known amount of right turn, the left front wheel could be turned back through a 40° arc, as measured on the angle indicators 49 for the scaler bar 26A and the direct caster reading is then present on the indicia dial 39B of the angle indicator. The same procedure can be followed for the right front wheel, for determining the caster, so long as a sensor is used which can be zeroed at one position of the wheels, after which the wheels are turned for determining the amount of caster. With strut mounts, the caster can be determined by measuring directly on the strut surface after the sensor 37 has been zeroed on the floor or platform on which the individual wheel is mounted, to provide a reference reading, and then using it directly to read the inclination of the axis of the strut. Likewise, the steering axis inclination of a McPhearson strut mounted wheel can be read directly by placing the angle indicator onto the strut after the sensor has been properly zeroed.

In FIG. 7, a further illustration of the ability to check whether or not the axis of the rear wheels is offset is shown. For example, if the axis indicated generally at 85 is tilted with respect to the axis of the front wheels, as illustrated, the readings on the scales 45C and 45D would be different than the reference readings. For example, the reading, if the axis 85 is tilted as shown, would be less on the scale 45C of the scaler bar 46, than the four-inch reference that is normally used, and greater than that reading on the scale 45D of the scaler part 26D. The necessary adjustments to reposition the wheels in the proper rolling plane can be made so that the readings then will become equal.

The fixtures herein, coupled with an easy to use commercially available angle indicator that can be quickly zeroed, makes the alignment of four-wheel drive vehicles and other vehicles quite easy because the various readings necessary can be obtained directly without forming a reference plane around the vehicle, and with having simple compact fixtures which are all within the rolling radius of the wheels.

The nonsteering wheels do not require the angle indicia and thus the scaler bars may be shortened if desired.

The lines used such as 55A and 55B have to have some elasticity to compensate for wheel movement during steering.

Referring again to FIG. 7, the "tram", or in other words the squareness of the wheels can be determined by measuring the distance between the inner scaler bars on the same side of the vehicle after the toe-in and toe-out have been measured, to make sure the distances are equal. Adjustment of one of the wheels front or back can be made as desired.

Although the present invention has been described with reference to preferred embodiments, workers skilled in the art will recognize that changes may be made in form and detail without departing from the spirit and scope of the invention.

What is claimed is:

1. A wheel alignment and measuring apparatus comprising a fixture for precisely mounting onto a wheel having an axis of rotation and defining a rolling plane perpendicular to the axis, an annular surface of the wheel which is spaced from and faces inwardly toward the axis, and a shoulder surface on the wheel substantially parallel to the rolling plane of the wheel joining said annular surface, said shoulder surface being spaced inwardly from an outermost rim edge, said fixture comprising first and second scaler assemblies, each of said scaler assemblies including a scaler bar having a longitudinal axis, and a head member, each of said head members having a mounting surface that is perpendicular to the longitudinal axis of the scaler bar and adapted to engage the shoulder surface of a wheel for precisely positioning the scaler bars perpendicular to the rolling plane of the wheel;

means on each head member engaging said annular inwardly facing surface at two separated locations for centering said head members along a diametral line relative to the axis of the wheel;

means to create a force tending to separate said head members to securely lock the head member onto the wheel with the scaler bars thereby positioned at a known location with respect to the wheel;

means on the scaler bars to provide a distance measurement from the plane defined by the shoulder surface and against which the head members seat in direction parallel to the wheel axis; and angle indicating means on at least one of the scaler bars of one fixture for holding a provided reference line extending to another fixture on a wheel on the same side of a vehicle on which the fixtures are mounted, said angle indicating means having indicia forming radial lines from a center and the reference line being attached at the one scaler bar at such center, the radial lines being calibrated for directly indicating the angle of steer of a wheel on which the first mentioned fixture is mounted by orienting such radial lines relative to the mounting surfaces of the head member of the one scaler bar having such angle indicating means.

2. The apparatus as specified in claim 1 further comprising means for attaching a line member to each scaler bar, whereby in a four-wheel vehicle having a pair of front wheels and a pair of rear wheels with fixtures mounted on each wheel and the scaler bars on each fixture lying on a generally horizontal plane to provide front and rear scaler bars on each wheel, separate lines are mounted on the scaler bars to the front on the front wheels and on the scaler bars to the rear on the rear wheels, each at a known distance from the respective head member of the respective scaler bar for determining toe-in and toe-out conditions of a wheel by noting the measurements from the scaler bar on the other of the front and rear scaler bars of each of said fixtures with respect to the line.

3. The apparatus as specified in claim 2 and further comprising an arm mounted on each fixture, said arm having a surface that is positioned parallel to the surfaces of the head members that engage the shoulder surface of a wheel on which the fixture is mounted, and angle measuring means adapted to be positioned at a known relationship with respect to the surface of the arm for determining angle inclinations.

4. The apparatus as specified in claim 1 wherein there are fixtures having angle indicating means on each of the wheels of the vehicle which steer, and lines extending on opposite sides of the vehicle to reference positions, whereby the steering of the wheels of the vehicle which steer provides angle indications at each of such wheels on the scaler bars having the angle indicating means.

5. In a measuring system for use with a vehicle having four wheels including tires defining a wheel periphery, each of which wheels also defines a rolling plane perpendicular to a rotational axis of such wheel, such vehicle having at least two wheels which steer about separate steer axes, the improvement comprising a separate fixture for mounting on each of said wheels, each of said fixtures including a scaler bar that has a head member with a head member surface and a longitudinal axis held by the fixture to be perpendicular to the rolling plane of the respective wheel and positioned adjacent to the periphery of the respective wheel, but within the periphery and with the head member surface held against a reference surface of the respective wheel which is substantially parallel to the rolling plane, with the scaler bar being adjacent to a horizontal plane passing through the rotational axis of the wheel on which the scaler bar is mounted, a line for extending from the front to the rear on each side of a vehicle on which the scaler bars are mounted, means to secure said line to the respective fixtures in position overlying a surface on the scaler bars on the wheels of the vehicle which steer, the lines on each side of the vehicle being spaced outwardly a known amount from the reference surface of the wheel on which the respective fixture holding the line is mounted, the scaler bars on each of the wheels of the vehicle which steer including angle indicating indicia on the surface thereof which the respective line overlies, the angle indicating indicia indicating angles from a center thereof, the indicia being referenced to the axis of steer of the associated wheel in a known relationship, and the respective line being fixed at the center of the respective angle indicating indicia and overlying the angle indicating indicia, whereby the angle indicating indicia will change position relative to the line when the wheels of the vehicle which steer are steered.

6. The apparatus as specified in claim 5 further comprising means for providing a fixture reference surface parallel to the head member surfaces, said fixture reference surface having means for mounting an angle indicating member thereon for determining the inclination with respect to a support surface on which the wheel is mounted, said angle indicating member including means for permitting the angle indicating member to be placed on such support surface adjacent the wheel and indicate a reference angle of such support surface.

7. The apparatus as specified in claim 6 wherein said angle indicating member includes means for zeroing the angle indicating member when resting on a support surface adjacent the wheel, prior to the time that the fixture reference surface is engaged by the angle indicating member.

8. The apparatus as specified in claim 6 wherein said angle indicating indicia for each of the steering wheels is correlated to indicate the amount of steer of the wheels about the steer axis of the individual wheel, whereby toe-in during steering can be determined by comparing the angle readings between the two angle indicia on the steering wheels on opposite sides of the vehicle.

* * * * *

UNITED STATES PATENT AND TRADEMARK OFFICE
CERTIFICATE OF CORRECTION

PATENT NO. : 4,967,480
DATED : November 6, 1990
INVENTOR(S) : George M. DeLuca

It is certified that error appears in the above-identified patent and that said Letters Patent is hereby corrected as shown below:

Col. 10, line 15, insert --each-- before "said".

Signed and Sealed this

Eleventh Day of August, 1992

Attest:

DOUGLAS B. COMER

*Attesting Officer*  *Acting Commissioner of Patents and Trademarks*